United States Patent
Isobe et al.

(10) Patent No.: US 6,756,548 B2
(45) Date of Patent: Jun. 29, 2004

(54) APPARATUS AND METHOD FOR MEASURING MASS IN A MICROGRAVITY ENVIRONMENT

(75) Inventors: Jun Isobe, Rosemead, CA (US); Al MacKnight, Lakewood, CA (US); Vipul P. Patel, Irvine, CA (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 10/011,076

(22) Filed: Dec. 6, 2001

(65) Prior Publication Data

US 2003/0106374 A1 Jun. 12, 2003

(51) Int. Cl.⁷ .............................................. G01G 7/00
(52) U.S. Cl. .............................. 177/210 FP; 177/229; 73/580
(58) Field of Search .......................... 177/210 FP, 229, 177/DIG. 11; 73/580

(56) References Cited

U.S. PATENT DOCUMENTS

| | | | |
|---|---|---|---|
| 3,519,093 A | * 7/1970 | Ramsay | 177/210 FP |
| 3,555,886 A | 1/1971 | Thornton | 73/580 |
| 3,566,678 A | 3/1971 | Christmann | 73/580 |
| 4,249,411 A | 2/1981 | Pearson | 73/12.1 |
| 4,370,888 A | * 2/1983 | Popper | 73/580 |
| 4,405,024 A | 9/1983 | Fraval et al. | 177/200 |
| 4,778,018 A | 10/1988 | Cordery et al. | 177/210 FP |
| 4,838,371 A | * 6/1989 | Rupprecht et al. | 177/210 FP |
| 5,191,949 A | * 3/1993 | Mills et al. | 177/229 |
| 5,442,960 A | 8/1995 | Solberg, Jr. et al. | 73/580 |
| 5,474,049 A | * 12/1995 | Nagaishi et al. | 73/580 |
| 5,481,072 A | * 1/1996 | Ford | 177/210 FP |
| 5,877,457 A | * 3/1999 | Corniani et al. | 177/116 |
| 5,900,590 A | 5/1999 | Solberg, Jr. et al. | 177/1 |
| 5,902,964 A | 5/1999 | Solberg, Jr. et al. | 177/1 |
| 6,073,667 A | * 6/2000 | Graffin | 141/83 |

* cited by examiner

Primary Examiner—Randy W. Gibson
(74) Attorney, Agent, or Firm—Oral Caglar, Esq.

(57) ABSTRACT

An apparatus and method of measuring the mass of a test specimen located in a microgravity environment. The test specimen is attached to the free end of a cantilevered spring for joint vibration. The natural frequency of vibration of the spring and specimen are measured. The spring constant is calculated and compared with known masses having the same frequency and spring constant. When a match is found, the mass of the test specimen is known.

22 Claims, 2 Drawing Sheets

APPARATUS AND METHOD FOR MEASURING MASS IN A MICROGRAVITY ENVIRONMENT

BACKGROUND OF THE INVENTION

The present invention generally relates to a method and apparatus capable of measuring the mass of a specimen by subjecting the mass to a vibrational load and comparing the measured frequency of vibration to frequencies of known masses. In particular, the present invention is directed to an apparatus for determining the mass of a specimen located in a microgravity environment. Such a microgravity environment will exist on the International Space Station (ISS) or any craft in near Earth orbit.

A problem confronts scientists when attempting to monitor the mass of a quantity of fluid present in a container located in a microgravity environment. For example, on the ISS it would be difficult to economically monitor the changing mass of a life-sustaining fluid because the mass of the fluid could not be accurately determined due to the microgravity. There is no known approach which utilizes information obtained in a gravity environment to determine the mass of a specimen located in a microgravity environment. Whether the test specimen is in fluid or solid form, the problem of determining the mass microgravity has proven difficult if not impossible.

There clearly is a need for a measuring apparatus and method capable of determining the mass of a test specimen maintained in a microgravity environment. There is also a need for a measuring apparatus capable of repeatedly providing accurate readings regardless of changes in the mass or its environment. There is, moreover, a need of a measuring apparatus, i.e., scale, that is compact in size, of minimum weight and as economical as possible to construct.

SUMMARY OF THE INVENTION

In one aspect of the present invention recognizes a mass of a test specimen is measured by subjecting the mass to either a constant vibrational load i.e., forced vibration, or by subjecting the mass to a mechanical impulse i.e., free vibration. In either instance, the specimen vibrates at a specific frequency indicative of the mass of the specimen. By performing a number of similar tests in a gravity environment, it is possible to determine the calibration frequencies achieved by a number of specimens of differing mass. By comparing the frequency of the specimen tested in the microgravity environment with the set of pre-determined frequency calibration curves established for known masses, the mass of the test specimen is determined.

In another aspect of the present invention, a test specimen located in a microgravity environment and having a mass to be determined is attached to a freely vibrating spring. As the spring is repeatedly vibrated, a sensor measures the frequency of vibration. By calculating the spring constant and referring to a previously determined spring constants for given masses, it becomes possible to determine the mass of the test specimen In another aspect of the invention, a test specimen located in microgravity is contained within a tank attached to a vibrating mount. The tank also includes a pressurized gas separated from the fluid test specimen by a flexible member which may take the form of a bellows or a bladder. The vibrating mount repeatedly oscillates in order to determine the natural frequency of vibration of the mount, from which the spring constant of the mount can be calibrated. This, in turn, may be used to determine the mass of the test specimen.

In a yet further aspect of the present invention, a fluid specimen located in a microgravity environment is located within a tank including a bellows and pressurized Nitrogen on the other side of the bellows. The vibrating mount takes the form of a cantilevered beam bolted at one end to a rigid structure. During operation, a sensing element achieves maximum sensitivity in monitoring the frequency of vibration of the vibrating mount, the tank and the fluid test specimen. A device referred to as a "pinger" supplies a mechanical impulse to induce a natural frequency of any object to which the pinger is attached. The pinger serves to oscillate the vibrating mount, thus providing "in situ" readings of the undamped natural vibration frequency of the tank and fluid test specimen.

In order to determine the mass of the fluid, the spring constant of the vibrating mount is first calculated with a known mass and measured frequency of natural vibration of the mass. The unknown mass of fluid can then be determined by comparing the frequency of vibration of the test fluid with the frequencies of vibration of known masses. Preferably, known frequencies may be used to create a set of frequency calibration data. Though the spring constant of the of the vibrating mount and tank may vary slightly through differing amplitudes under differing gravity conditions, these minor variations may be easily compensated for in the set of pre-determined calibration curves.

In another aspect of the present invention, a method is disclosed for measuring the mass of a test specimen located in a microgravity environment. The specimen may be mounted on the free end of a spring member having an opposite end attached to a rigid member. As the spring and mass are forced to vibrate, a sensor measures the natural frequency of vibration. The spring constant may then be calculated and knowing the frequency of vibration for known masses utilizing a spring with the same constant, it is possible to determine the mass of the test specimen.

In another aspect of the present invention, a method is disclosed for measuring the mass of a fluid in a microgravity environment. The fluid may be deposited in a tank on one side of a flexible member which take the form of a bellows or a bladder with a pressurized gas located on the opposite side of the bellows to maintain pressure on the fluid. The tank may be attached to the free end of a cantilevered spring which is forced to vibrate. A sensor is positioned to monitor the frequency of vibration, allowing the spring constant to be determined. This can be compared to the vibration of known masses in a full gravity environment under a spring with the same constant to determine the mass of the fluid.

These and other features, aspects and advantages of the present invention will become better understood with reference to the following drawings, description and claims.

BRIEF DESCRIPTION OF THE DRAWINGS

FIG. 2b is top view of the scale formed in accordance with the present invention and shown in FIG. 2a;

FIG. 2c is a cross sectional front view of the scale formed in accordance with the present invention and shown in FIG. 2a;

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
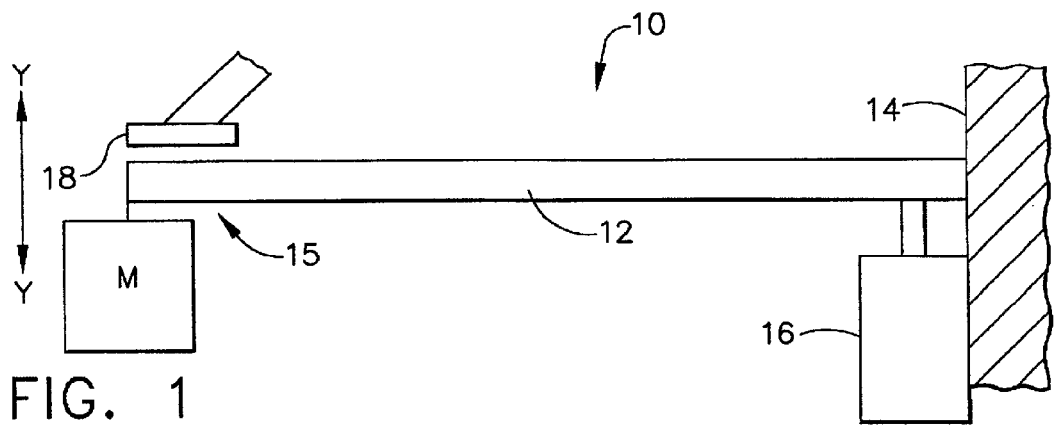
FIG. 1 is a schematic view of a measuring device incorporating the principles of the present invention.

Referring to FIG. 1, the basic concept of the present invention 10 is schematically depicted as utilizing a spring in the form of a cantilevered beam 12 attached at one end to a rigid member 14 and having a "free end" 15 capable of vibrating itself along with an attached mass M. A device 16 periodically induces cantilevered beam 12 and attached mass M to vibrate along a path shown by the arrows Y—Y. A sensor 18 is positioned to measure the frequency of the vibration of beam 12 and mass M. A variety of types of sensors 18 may be utilized, including but not limited to a simple strain gage, an accelerometer and even a proximity probe. The choice of sensor 18 may be made according to the size of the mass M to be measured and/or the desired accuracy of the required measurement.

The operation of the apparatus formed in accordance with the present invention utilizes the principle of a free-vibrating system including a mass and a spring, i.e., the beam. The undampened natural frequency $f_n$ (Hz) of the oscillating system is:

$$f_n = \frac{1}{2\pi}\sqrt{\frac{k}{m}} \quad \text{(Equation 1)}$$

where m (kg) is the oscillating mass, k is the spring constant. The mass M may be determined as follows:

Step 1. The spring constant k must first be calibrated. Spring constant k can be calculated with a known mass $m_1$ and measured frequency $f_1$ using the following equation:

$$f_1 = \frac{1}{2\pi}\sqrt{\frac{k}{m_1}} \quad \text{(Equation 2)}$$

Step 2. The new mass $m_2$ now can be determined by using the spring constant k calibrated in Step 1 and measured frequency $f_2$. By a similar relation as Equation 2:

$$f_2 = \frac{1}{2\pi}\sqrt{\frac{k}{m_2}} \quad \text{(Equation 3)}$$

The spring constant k may vary slightly through different amplitudes and gravity conditions, but these can be compensated for with the use of calibration curves for k.

The "spring" referred to above may take the form of the beam 12 or make take a different form such as a vibrating table. The form of the spring is only limited by the ability to accurately measure its frequency of vibration. By ensuring that the amplitude of the vibration is limited, it is possible to minimize changes in the spring constant k even as the mass M changes.

Figure 2A:
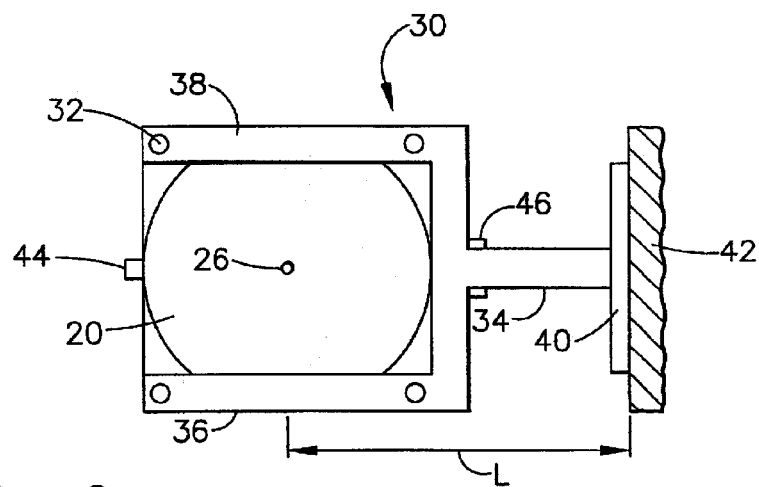
FIG. 2a is a bottom view of a scale formed in accordance with the present invention.
Figure 2B:
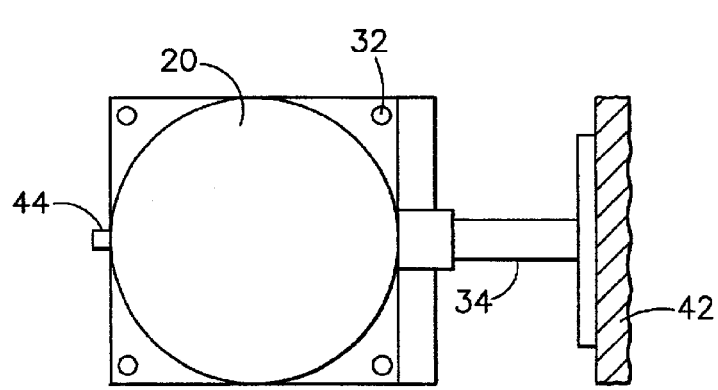
Figure 2C:
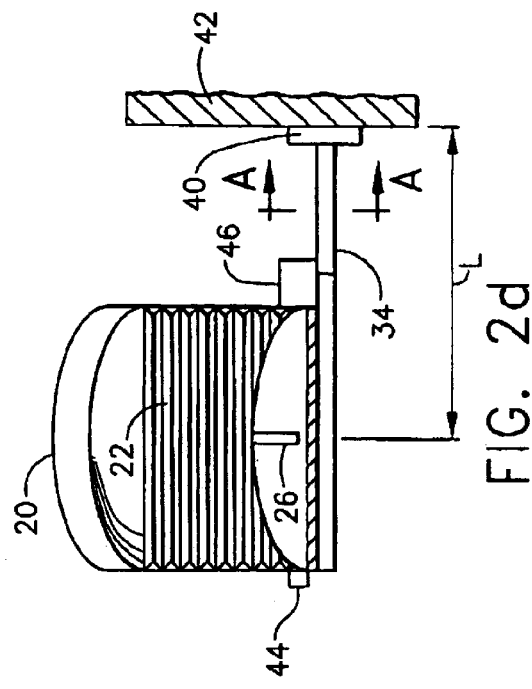
Figure 2D:
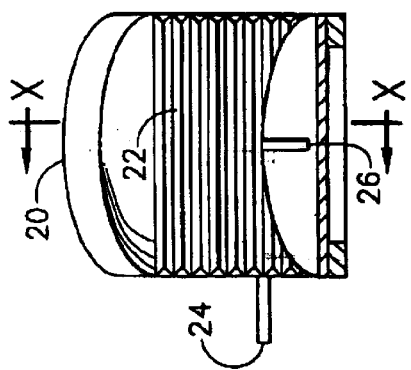
FIG. 2d is a cross sectional side view of the scale formed in accordance with the present invention as taken along axis X—X in FIG. 2c.

Referring now to FIGS. 2a–2d, one aspect of the present invention will be discussed in greater detail. In particular, FIGS. 2c and 2d shows an apparatus formed in accordance with the present invention to include a liquid tank 20 enclosing a flexible member which may take the form of bellows 22. Alternatively, a bladder may be utilized as the flexible member. A first port 24 allows a pressurized gas such as pressurized Nitrogen to be introduced into a portion of tank 20 located on a first side of bellows 22. A second port 26 extends into a portion of tank 20 located on an opposite side of bellows 20 from port 24. This may allow a target specimen of fluid to be introduced into a side of tank 20 on an opposite side of bellows 22 from the pressurized nitrogen. During operation, the pressurized nitrogen serves to maintain bellows 22 in contact with the target fluid regardless of any changes in its amount or position where the nitrogen, bellows 22 and specimen are enclosed within the tank 20.

Because of the arrangement of bellows 22, the pressurized nitrogen as well as the target fluid, bellows 22 is limited to one degree of freedom. Enclosing tank 20 may be fixedly attached to a vibrating mount 30 by bolts 32 or any other conventional fasteners as shown in FIGS. 2a and 2b. Referring further to FIG. 2a, vibrating mount 30 may function as a spring member having a fork-shaped configuration that may include an elongated base portion 34 and a pair of attached arm portions 36, 38 extending parallel to each other on opposite sides of tank 20. An end 40 of vibrating mount 30 oppositely disposed from arm portions 36, 38 may be fixedly attached to a rigid member 42. Member 42 may comprise any component of sufficient mass so as to be able remain fixed in position when subjected to vibration of vibrating mount 30 and attached tank 20. As will become readily apparent, vibrating mount 30 functions as a spring in a manner similar to beam 12.

As shown in FIG. 2a, a vibration sensing element or sensor 44 is located at an opposite end of tank 20 from the elongated base portion 34 of vibrating mount 30. This assures that sensor 44 will under go maximum vibrational movement. A device such as a "Pinger" 46 may be located anywhere along vibrating mount 30, but preferably is located adjacent to elongated base portion 34. During operation, pinger 46 serves to cause vibrating mount 30 and attached tank 20 to repeatedly oscillate.

When utilizing a single mass of fluid and a single vibrating mount 30, it may be assumed that bellows 22 is stationary with regard to the tank 20 reference frame. As previous stated, the natural frequency $f_n$ (Hz) may be calculated from Equation 1. The mass of the target specimen of fluid contained within tank 20 may then be determined. First the spring constant of vibrating mount 30 may be calculated with a known mass by utilizing Equation 2. Then the mass of the fluid in tank 20 may be determined by using the spring constant of vibrating mount 30 determined by Equation 1 and the measured frequency for vibrating mount 30 utilizing Equation 3.

Figure 3:
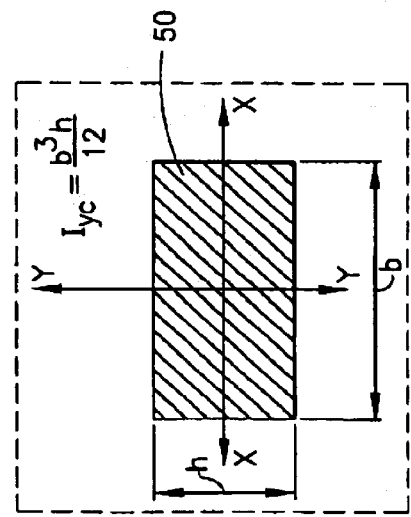
FIG. 3 is a view of the scale taken along axis A—A of FIG. 2d showing the direction of vibration of the scale formed in accordance with the present invention.

In order to better understand the operation of the present invention, the method of measuring the specific mass of a fluid enclosed within tank 20 is determined. The method begins with introducing a quantity of fluid through port 26 into one side of tank 20 and a quantity of pressurized Nitrogen gas through port 24 into the opposite side of tank 20 such that bellows 22 maintains contact with the fluid. Pinger 46 is then activated to start vibrating mount 30, tank 20 and the fluid vibrating. Sensor 44 measures the frequency of vibration. Referring now to FIG. 3, a realistic value for a spring constant k may then be determined by $$k = \frac{3EI}{L^3} \quad \text{(Equation 4)}$$

for a cantilevered beam similar to vibrating mount 30. The moment of inertia I is then determined by $$I_{yc} = \frac{b^3 h}{12}, \quad \text{(Equation 5)}$$

5), based on the rectangular cross-section 50 of the vibrating mount 30 as shown in FIG. 3 having the length and height b and h, respectively. In order to determine the Modulus of Elasticity for the particular vibrating mount 30, it is necessary to know its composition. One well known composition having sufficient flexibility is 6061 Aluminum alloy. For the present example, the values for the apparatus formed in accordance with the present invention are:

Cross-section 50 $(b \times h) = 0.152 \times 0.076 m$ (or $6 \times 3$ in).

Modulus of Elasticity E of 6061 Alloy=$6.83 \times 10^{10}$ Pa (or $9.9 \times 10^6$ psi).

Effective length L of vibrating mount 30 (the distance from the point of attachment of elongated base portion 34 with the rigid member 42 to the center of mass of tank 20 as projected to the plane of vibrating mount 30)=0.438 m (or 17.25 in)

Using the cross sectional measurement $(b \times h) = (0.152 \times 0.076$ m) in Equation 5 yields a value for $I_{yc}$ of $2.248 \times 10^{-5}$ $m^4$ (or 54.0 $in^4$). Inserting these values along with the value of L into Equation 4, the resulting k=$5.472 \times 10^7$ $kg/s^2$ [N/m] (or $3.125 \times 10^5$ $lb_f$/in). With k thus known, the unknown mass $m_2$ can be readily calculated by measuring the resulting frequency $f_2$. Rearranging Equation 3, it becomes $$m_2 = \frac{k}{4\pi^2 f_2^2}.$$

Using k=$5.472 \times 10^7$ $kg/s^2$ and with a frequency readout of $f_2$=166.5 Hz, the mass $m_2$ is determined to be 50 kg. As stated, the actual dimensions of the measuring apparatus formed in accordance with the present invention may be selected based on the available space as well as the approximate amplitude of vibration that is desired for a range of target specimen to be measured.

It should be understood, of course, that the foregoing relates to preferred embodiments of the invention and that modifications may be made without departing from the spirit and scope of the invention. For example, any material having a Modulus of Elasticity indicating an ability to vibrate a measurable amount may be employed. The tank 20 may be replaced with any structure capable of supporting the test specimen undergoing vibration. The basic analytical system may change as a result. For example, if a bladder was used in place of the bellows, the basic system will take the form of a mass and two springs in series. Similarly, the test specimen may constitute a fluid, or solid material. In addition, the apparatus is not in any way limited to use in outer space, but has utility in any gravitational environment. The scope of the present invention is set forth in the following claims.

We claim:

1. An apparatus for measuring the mass of specimen in a microgravity environment, comprising:
   a test mass;
   a support member attached to the test mass, wherein the support member includes a tank enclosing a flexible member and having ports extending through wall portions of the tank on opposite sides of the flexible member;
   a spring attached at one end to the support member and attached at an opposite end to a rigid member, allowing the spring, support member and test mass to vibrate with one degree of freedom;
   a device for vibrating the spring, support member and test mass; and
   a sensor positioned to monitor the frequency of vibration of the spring, support member and test mass;
   whereby the mass of the test mass is determined from a comparison of frequencies of vibration of known masses.

2. The measuring apparatus according to claim 1 wherein the flexible member comprises a bellows and the test mass comprises a mass of fluid disposed in the tank on one side of the bellows.

3. The measuring apparatus according to claim 2, wherein a pressurized gas is disposed in the tank on a side of the bellows opposite from the mass of fluid, whereby the pressurized gas serves to press the bellows against the mass of fluid.

4. The measuring apparatus according to claim 3, wherein the pressurized gas comprises pressurized nitrogen.

5. A The measuring apparatus according to claim 1, wherein the spring comprises a vibrating mount having a base portion attached to the rigid member and a pair of arm portions rigidly attached to the tank, whereby the vibrating mount is free to vibrate in a manner similar to a cantilevered beam.

6. The measuring apparatus according to claim 5, wherein the sensor is attached to the support member.

7. The measuring apparatus according to claim 5, wherein the sensor comprises a strain gage mounted for joint movement with the support member.

8. An apparatus for measuring the mass of a test specimen, comprising:
   a support member, wherein the support member includes a tank enclosing a flexible member;
   the test specimen supported by the support member;
   a generally fork-shaped vibrating mount having a base portion fixedly attached to a rigid member and further having a pair of arm portions on an opposite end fixedly attached to the support member;
   a device for imparting vibration to the vibrating mount and the attached support member; and
   a sensor mounted on the tank for monitoring the frequency of vibration of the support tank and fluid, whereby the frequency of vibration of the test specimen is compared to frequencies of vibration of known masses to determine the mass of the test specimen.

9. The measuring apparatus according to claim 8, wherein the tank is located in a microgravity environment.

10. The measuring apparatus according to claim 9, wherein the flexible member divides the tank into two compartments, with one compartment containing the test specimen which comprises a mass of fluid and the other compartment contains a quantity of pressurized gas pressing the bellows against the mass of fluid.

11. The measuring apparatus according to claim 9, wherein the vibrating mount is made of 6061 Alloy having a modulus of elasticity E of approximately $6.83 \times 10^{10}$Pa (or $9.9 \times 10^6$psi).

12. The measuring apparatus according to claim 11, wherein the spring constant k of the vibrating mount is approximately, $$k = \frac{3EI}{L^3}$$

wherein L is the distance measured along the vibrating mount from the rigid member to approximately the center of the tank and I is the moment of inertia.

13. The measuring apparatus according to claim 12, wherein the moment of inertia I of the tank is approximately $$I_{yc} = \frac{b^3 h}{12}$$

wherein bxh is the rectangular cross section of the tank.

14. A method of determining the mass of a test specimen, comprising:
   attaching a tank enclosing a flexible member to a free end of a spring having an opposite end attached to a rigid member;
   depositing a test specimen in the tank;
   causing the test specimen and spring to vibrate at its natural frequency;
   monitoring the natural frequency $f_n$ of vibration of the test specimen and spring;
   calculating the spring constant k of a known mass having the same natural frequency; and
   comparing known masses having approximately the same spring constant k and frequency of $f_n$ with the test specimen to determine the mass of the test specimen.

15. The method according to claim 14, including the step of maintaining the test specimen in a microgravity environment when monitoring the natural frequency $f_n$ of vibration.

16. The method according to claim 15, including the step of forming the spring in the shape of a elongated fork having one end attached to a rigid member and a pair of arms attached to the tank.

17. A method of determining the mass of a fluid test specimen while located in a microgravity environment, comprising:
   depositing the fluid test specimen in a tank, enclosing a flexible member, attached to a free end of a cantilevered spring having an opposite end attached to a rigid member;
   causing the fluid test specimen and spring to vibrate at its natural frequency;
   monitoring the natural frequency $f_n$ of vibration;
   calculating the spring constant k of a known mass having the same frequency of vibration; and
   comparing known masses having approximately the same spring constant k and frequency of $f_n$ with the test specimen to determine the mass of the fluid test specimen.

18. The method of claim 17, including the step of forming the cantilevered spring in the shape of an elongated fork having a base portion attached to the rigid member and a pair of arms attached to the tank for joint vibration.

19. An apparatus for measuring the mass of a fluid test specimen located in a microgravity environment, comprising:
   a hollow tank having two compartments separated by a bellows member;
   the fluid test specimen deposited in one compartment and pressurized Nitrogen deposited in the second compartment;
   a generally fork-shaped, cantilevered spring vibrating mount having a base portion fixedly attached at one end to a rigid member and further having a pair of arm portions attached at opposite ends fixedly attached to the hollow tank;
   a device for repeatedly imparting vibration to the cantilevered spring vibrating mount and the attached hollow tank; and
   a sensor mounted on the hollow tank for monitoring the frequency of vibration of the hollow tank and fluid test specimen, whereby the frequency of vibration of the fluid test specimen is compared to frequencies of vibration of known masses to determine the mass of the fluid test specimen.

20. A method of determining the mass of a fluid test specimen located in a microgravity environment, comprising:
   depositing the fluid test specimen in a first compartment in a tank attached to a free end of a fork-shaped cantilevered spring having an opposite end attached to a rigid member;
   depositing pressurized Nitrogen gas in a second compartment separated from the first compartment by a flexible bellows;
   causing the fluid test specimen and cantilevered spring to repeatedly vibrate at its natural frequency;
   monitoring the natural frequency $f_n$ of vibration;
   calculating the spring constant k of a known mass having the same frequency of vibration; and
   comparing known masses having approximately the same spring constant k and frequency of $f_n$ with the test specimen to determine the mass of the fluid test specimen.

21. The method according to claim 17, including the step of maintaining the test specimen in a microgravity environment when monitoring the natural frequency $f_n$ of vibration.

22. The method according to claim 20, including the step of maintaining the test specimen in a microgravity environment when monitoring the natural frequency $f_n$ of vibration.

* * * * *